United States Patent [19]

McCartney, Jr. et al.

[11] Patent Number: 5,280,371
[45] Date of Patent: Jan. 18, 1994

[54] DIRECTIONAL DIFFUSER FOR A LIQUID CRYSTAL DISPLAY

[75] Inventors: Richard I. McCartney, Jr., Scottsdale; Daniel D. Syroid, Glendale; Karen E. Jachimowicz, Goodyear, all of Ariz.

[73] Assignee: Honeywell Inc., Minneapolis, Minn.

[21] Appl. No.: 911,547

[22] Filed: Jul. 9, 1992

[51] Int. Cl.⁵ .................................. G02F 1/133
[52] U.S. Cl. ................................ 359/40; 359/69
[58] Field of Search ....................... 359/69, 40, 41

[56] References Cited

U.S. PATENT DOCUMENTS

| | | | |
|---|---|---|---|
| 4,416,515 | 11/1983 | Fumada et al. | 359/69 |
| 5,052,783 | 10/1991 | Hamada | 359/41 |
| 5,101,279 | 3/1992 | Kurematsu et al. | 359/40 |
| 5,128,783 | 7/1992 | Abileah et al. | 359/40 |
| 5,161,041 | 11/1992 | Abileah et al. | 359/40 |

FOREIGN PATENT DOCUMENTS

| | | | |
|---|---|---|---|
| 0068400 | 10/1977 | Japan | 359/69 |
| 2-14822 | 8/1990 | Japan | 359/69 |

OTHER PUBLICATIONS

IBM Corp., "Polarized backlight for liquid crystal display", IBM Technical Disclosure Bulletin, vol. 33, No. 1B, Jun. 1990, pp. 143-144.

Primary Examiner—William L. Sikes
Assistant Examiner—Huy Mai
Attorney, Agent, or Firm—Dale E. Jepsen; A. Medved

[57] ABSTRACT

A display apparatus including a light source, a liquid crystal panel, and one or more directional diffuser lens arrays disposed therebetween provides a tailored variation of luminance with viewing angle, a uniform variation of luminance with viewing angle within a first predetermined range of viewing angles and a concentration of light energy within a second predetermined range of viewing angles.

3 Claims, 11 Drawing Sheets $\Theta_V$ = VERTICAL VIEW ANGLE

DIRECTIONAL DIFFUSER FOR A LIQUID CRYSTAL DISPLAY

BACKGROUND OF THE INVENTION

This invention relates in general to flat panel liquid crystal displays and, more particularly, to a liquid crystal display (LCD) having a directional diffuser to provide a tailored variation of luminance with viewing angle.

There are commercially available liquid crystal displays for use in various applications, including for example aircraft cockpit displays. However, a typical characteristic of the liquid crystal panel used therein is a wide variation of the light transmission of the liquid crystal panel with viewing angle, especially the vertical viewing angle. This results in gray-scale errors and off-state errors with viewing angle. That is to say, the brightness of certain areas of the display when viewed at angles above or below a vertical viewing angle normal to the display surface, may be substantially different than the brightness of those areas when viewed at an angle normal to the display surface. This variation of brightness or luminance with viewing angle is generally undesirable and particularly undesirable in those cases where the information being displayed on the liquid crystal display is critical to an operation such as controlling or navigating an aircraft.

In addition, a typical diffuser used to provide a light source for backlighting a typical liquid crystal display ordinarily provides a constant luminance with viewing angle and therefore provides the same amount of energy for any given viewing angle of the display. In certain applications, such as for example an aircraft cockpit, the typical vertical viewing angle is fixed within a relatively narrow range and it would therefore be desirable to concentrate a higher percentange of the energy from the light source within a particular range of viewing angles.

It would therefore be desirable to provide a directional diffuser for use with a liquid crystal display to provide a tailored variation of luminance with viewing angle while also providing a concentration of the light energy from the light source within a predetermined range of viewing angles.

SUMMARY OF THE INVENTION

It is therefore an object of the present invention to provide a directional diffuser element for a liquid crystal display to provide a tailored variation of luminance with viewing angle.

It is a further object of the present invention to provide a liquid crystal display having less variation of intermediate gray-level luminance with viewing angle.

It is still further an object of the present invention to provide a liquid crystal display combining the above features to provide a higher concentration of light energy, and therefore increased luminance, within a particular range of viewing angles thereby providing a more efficient use of light energy available from a light source.

The foregoing and other objects are achieved in the present invention wherein there is provided a liquid crystal display apparatus comprising a light source, a liquid crystal planar array of pixels for creating an image by controlling the amount of light allowed to pass through each of the pixels, and one or more directional diffuser lens arrays disposed between the light source and the liquid crystal array for providing a tailored variation of luminance from the liquid crystal display as a function of vertical viewing angle.

BRIEF DESCRIPTION OF THE DRAWINGS

The above mentioned and other features and objects of the present invention and the manner of attaining them will become more apparent and the invention itself will be best understood by reference to the following description of alternative embodiments of the invention taken in conjunction with the accompanying drawings wherein.

DESCRIPTION OF A PREFERRED EMBODIMENT

Figure 1:
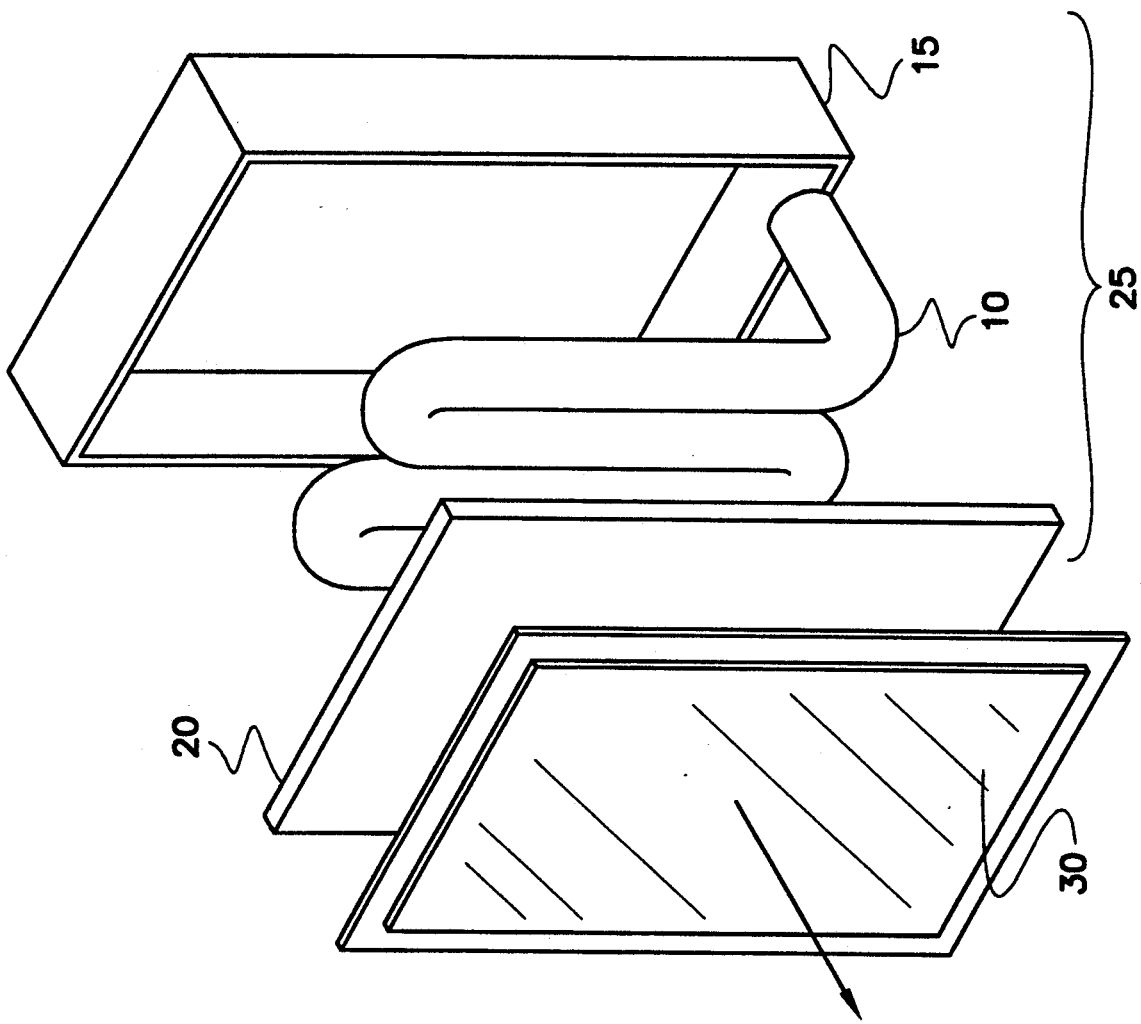
FIG. 1 is an exploded view of a typical prior art backlit liquid crystal display.

Referring now to FIG. 1 there is shown a cross section of a typical prior art liquid crystal display apparatus including backlight array 25 comprising lamp 10, rear reflecting surface 15 and lambertian diffuser 20. The backlight array provides a source of light which impinges on liquid crystal panel 30 comprised of a number of individual liquid crystal elements which are alternately energized in order to form a desired pattern or image for viewing from the front of the liquid crystal display.

Figure 3:
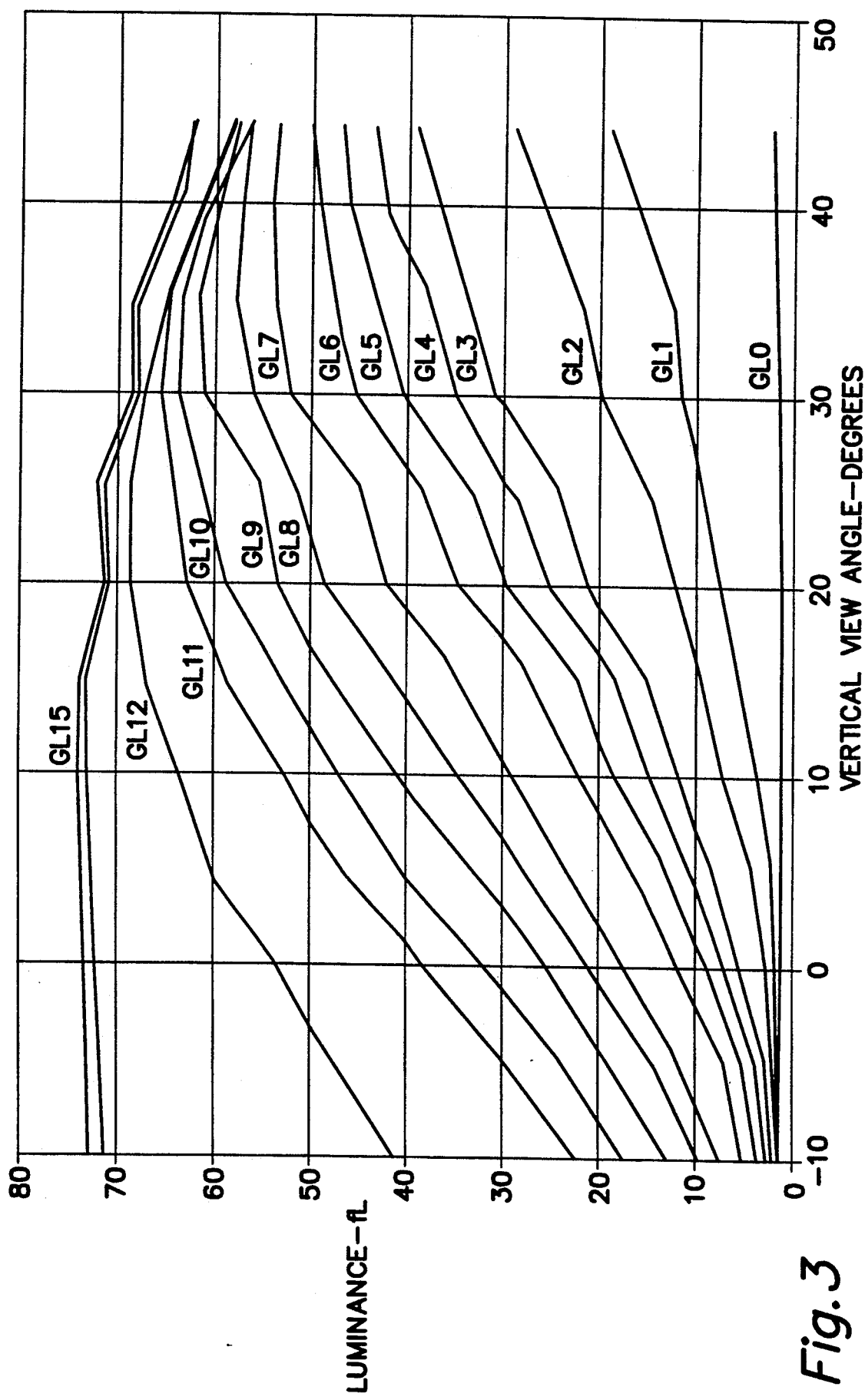
FIG. 3 illustrates a typical prior art LCD gray-level response showing the variation of luminance with vertical viewing angle.

While this typical prior art liquid crystal panel may be adequate for certain applications where the normal viewing angle is more or less at an angle normal to the display surface, this display is not optimum for applications wherein the typical viewing angle is other than at an angle normal to the display surface. This prior art display exhibits a relatively wide variation of light transmission with viewing angle, especially the vertical viewing angle. As illustrated in FIG. 3 this variation also changes with the level of lumination for various gray-levels or intermediate intensities for a given display.

As can be seen in the curves of FIG. 3, the luminance emitted from the lower gray-levels of the LCD system increases significantly with increasing vertical viewing angle. This variation presents an undesirably large luminance increase with angle when the information being presented is low-level luminance information, such as for avionics applications including weather radar or attitude director indicator presentations. As a pilot viewing the display moves his vertical perspective, or his viewing angle, higher above a normal angle to the display (larger vertical viewing angles), he observes a low luminance field increase significantly in luminance, thereby causing confusion in interpretation of critical display information.

In addition, the lambertian diffuser of the typical prior art display, element 20 of FIG. 1, provides for a nearly equal luminance in all angular viewing directions. In most applications a 180° field of view in both horizontal and vertical directions is not required. It would therefore be more energy efficient if a substantial portion of the light energy could be redirected so as to be concentrated in the viewing angles of interest for a particular application.

Figure 2:
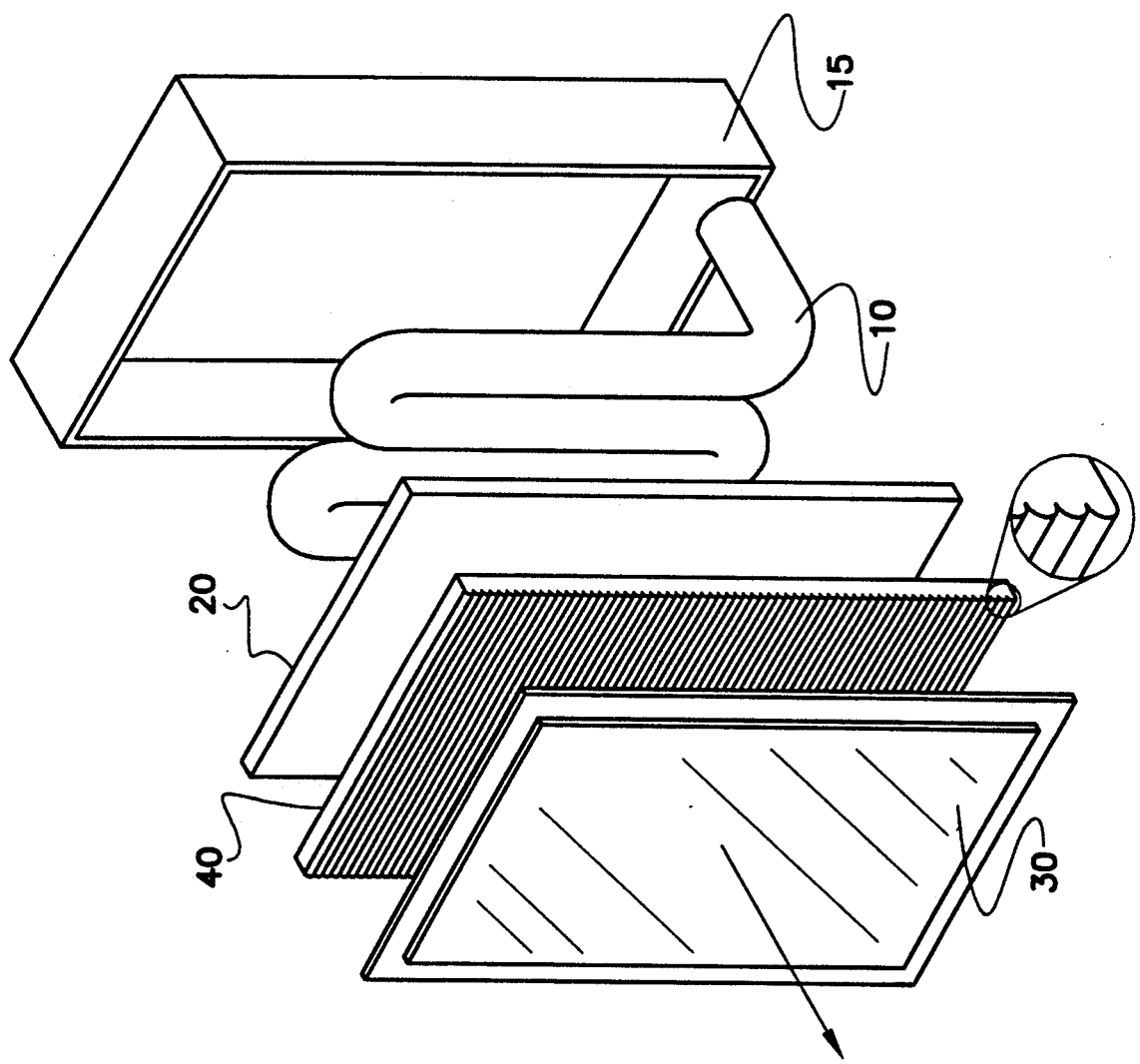
FIG. 2 is an exploded view of the liquid crystal display of the present invention, having a directional diffuser lens array.

The apparatus of the present invention includes the backlight array and liquid crystal of the prior art as shown in FIG. 1 with the addition of a lens array 40 inserted between the lambertian diffuser 20 of the prior art and liquid crystal display panel 30, as shown in FIG. 2. It was found that by inserting a directional diffuser consisting of a cylindrical lens array 40 between the lambertian diffuser and the liquid crystal panel that both of the desired effects could be accomplished. That is, the overall light energy is concentrated within a desired rang of viewing angles and the variation of luminance with viewing angle is tailored to offset that which is obtained through the liquid crystal display alone.

Figure 4A:
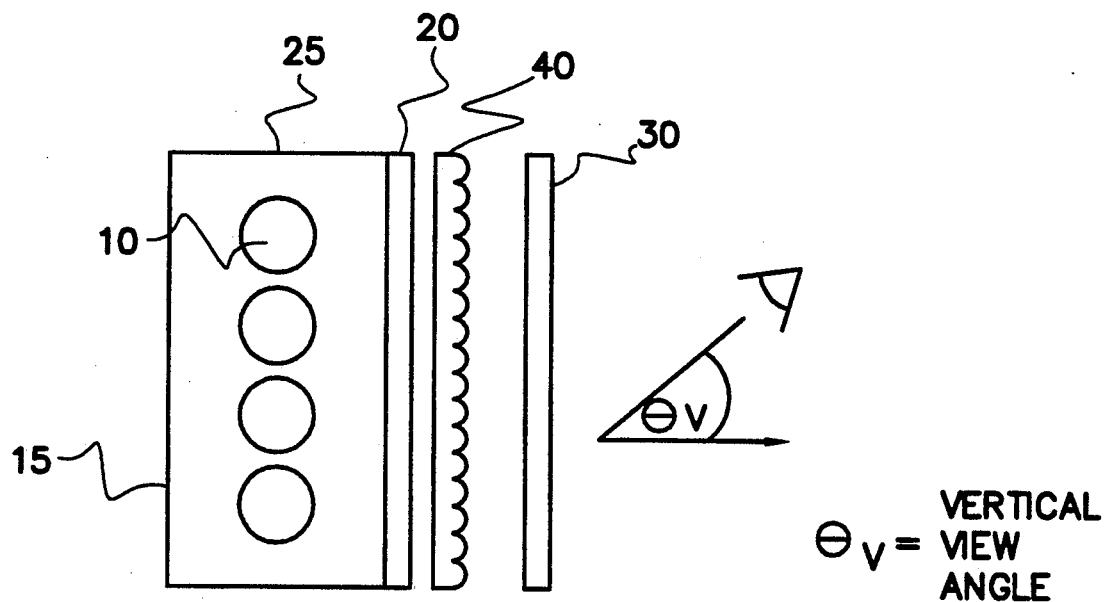
FIGS. 4A and 4B show cross sectional side and top views of a typical assembly including the lens array of the present invention.
Figure 4B:
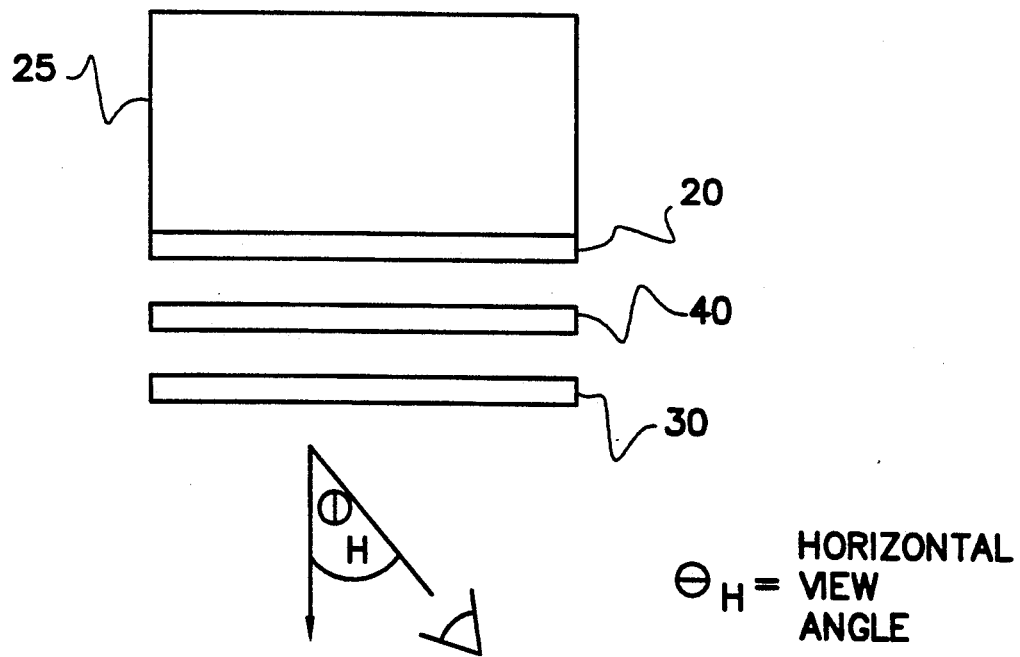
Figure 5:
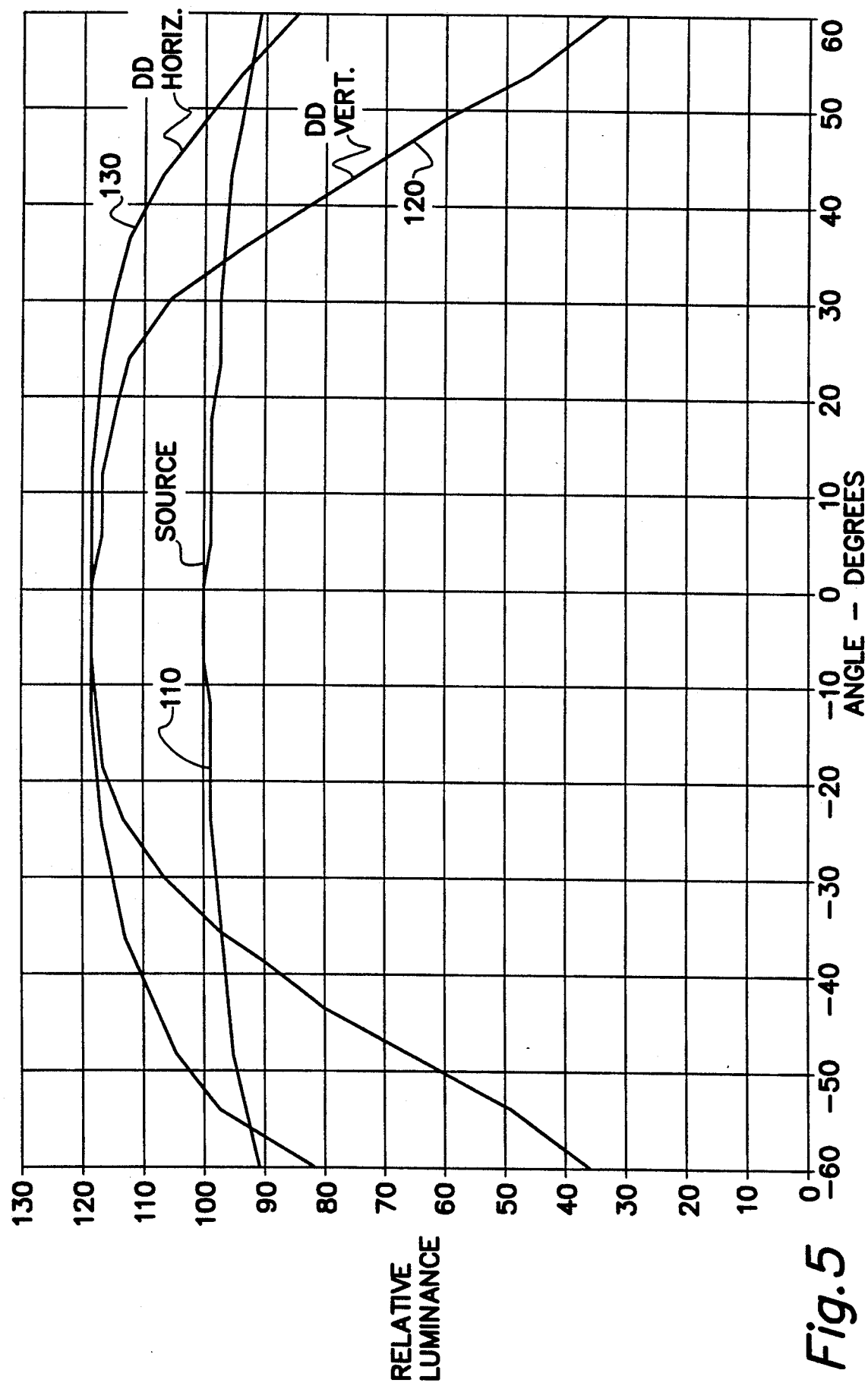
FIG. 5 illustrates the variation of luminance with viewing angle for a light source alone and a light source combined with a single lens array.

For example, FIG. 5 illustrates that with the insertion of lens array 40 as shown in FIGS. 4A and 4B, the overall luminance has increased approximately 20 percent within a range from −20° to +20° viewing angle and the desired decrease in luminance with increased vertical viewing angle is obtained between approximately +10° and +35° of vertical viewing angle. Curve 110 of FIG. 5 illustrates the variation of luminance with viewing angle for the lambertian light source only, in both the horizontal and vertical angles while curves 120 and 130 respectively represent a variation of luminance with vertical and horizontal viewing angles for the backlight including lens array 40.

Figure 6:
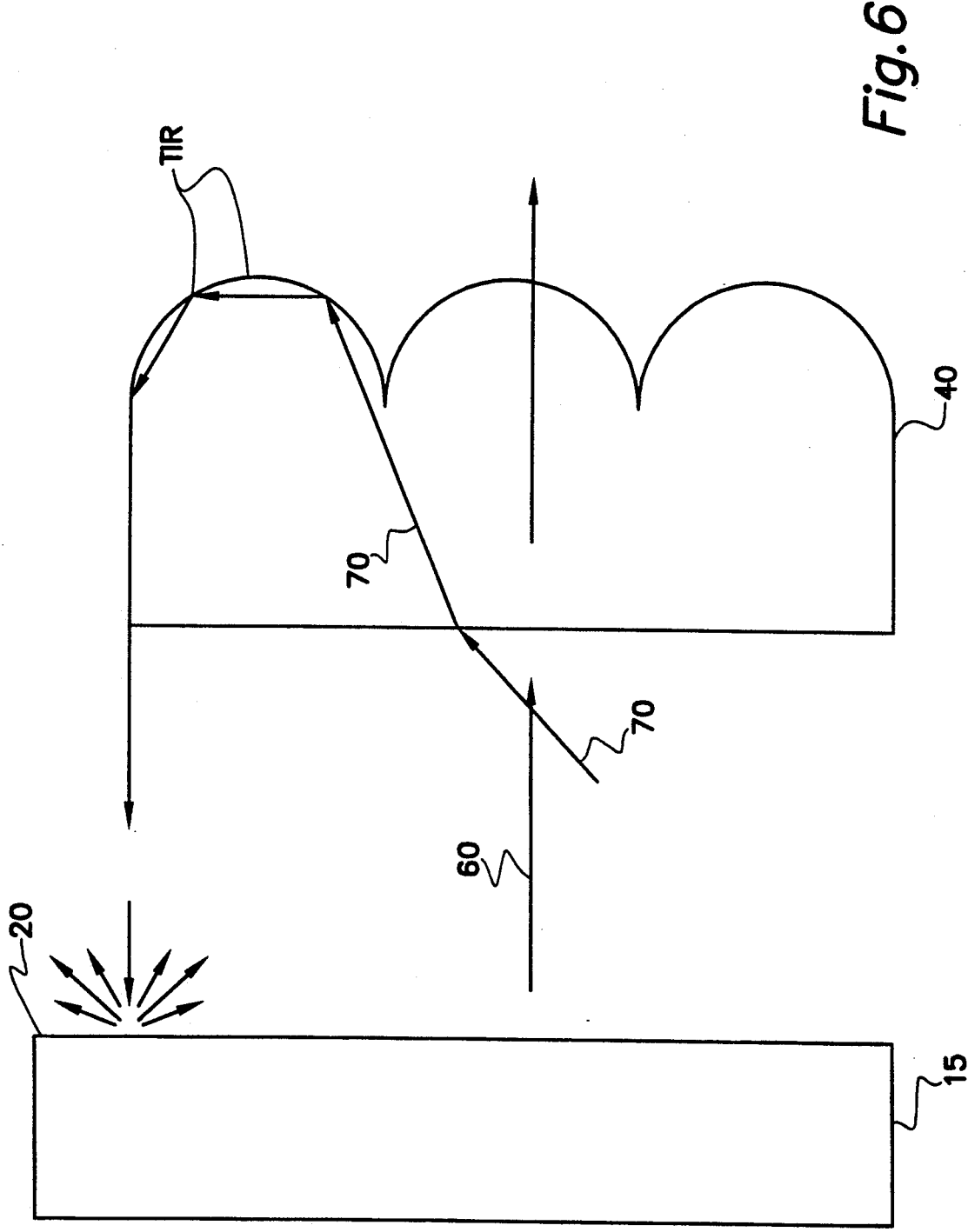
FIG. 6 illustrates the path of various light rays when striking the lens array at various angles.

The effect which results from the insertion of the cylindrical lens array is explained by reference to FIG. 6 wherein there are shown light rays from the lambertian (having uniform luminance with angle) source diffuser impinging on the lens array from various angles. An air gap must be present at the interface of the lambertian diffuser and the lens array. The normal 4 percent loss per surface due to fresnel reflections is not incurred, because the surface reflections are returned to the diffuser and reflected again.

Those rays that are normal to the source diffuser but less than the critical angle within the lens array are passed through the lens array materially unobstructed, except for a small amount of surface reflection. Rays which enter at oblique angles and are greater than the critical angle of the lens array undergo total internal reflection at the inside of the lens surface as illustrated by ray tracing 70. These rays are reflected with no loss due to the total internal reflection effect around the lens periphery. They exit the rear of the lens array and return to the source diffuser where they undergo a secondary diffuse reflection from the source diffuser.

However, because the source diffuser is not totally reflective, some of the returned rays are transmitted through the diffuser and are then reflected from the backlight enclosure surface 15 of FIG. 4A. Some fraction of these rays are reflected internally to exit the diffuser again. These reflected rays again have a lambertian distribution at the surface of lambertian diffuser 20. It is apparent from this interaction between the lens array and the backlight that rays which impinge close to the normal tend to be intensified while those rays which impinge at oblique angles undergo total internal reflection and are returned to the diffuser and diminished somewhat from this statistical process.

However, the roll off or variation with vertical viewing angle for this single directional diffuser cylindrical lens array was not sufficient to offset the effects of the liquid crystal display, and there were significant moire patterns caused by the interference between the lens array and the display panel wherein the lens array contained 142 lenses per inch and the display panel matrix had a spatial frequency resolution of 172 dots or pixels per inch.

For the desired specific implementation it was discovered that the adverse interaction producing moire patterns could be eliminated by including a second lens array with a different number of lenses per inch. The combination of the dual lenses increased the desired reduction in luminance with increased viewing angle, and in addition reduced or eliminated the moire patterns with the selection of an appropriate pitch, or number of lenses per inch, for the two lenses in question.

Figure 7:
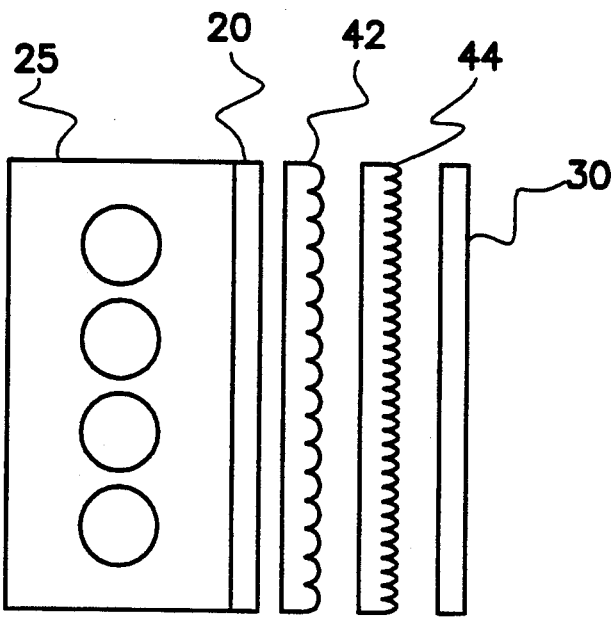
FIG. 7 is a cross sectional view of a preferred embodiment of the present invention with two lens arrays.
Figure 8:
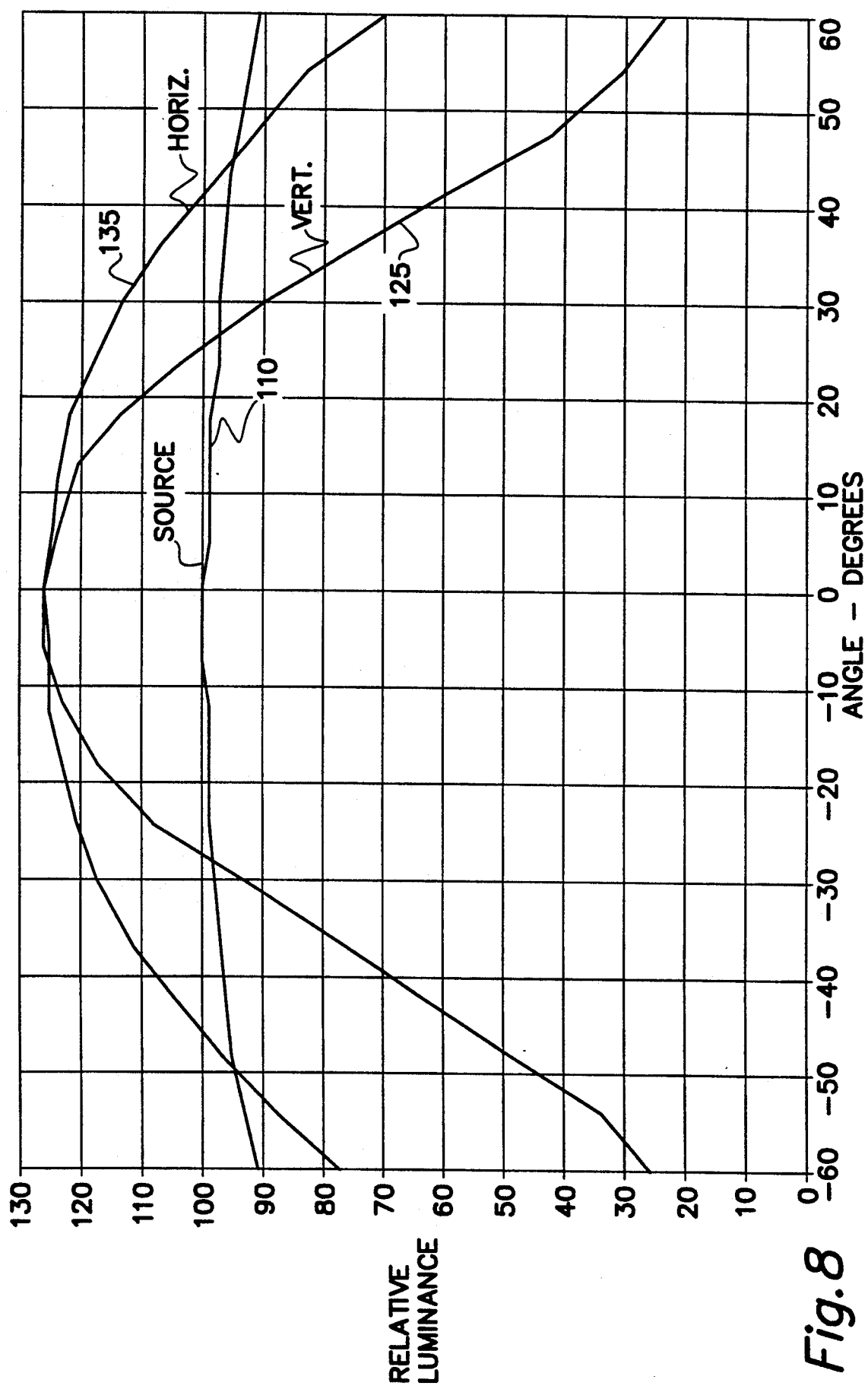
FIG. 8 illustrates the variation of luminance with viewing angle for the dual lens array configuration.
Figure 9:
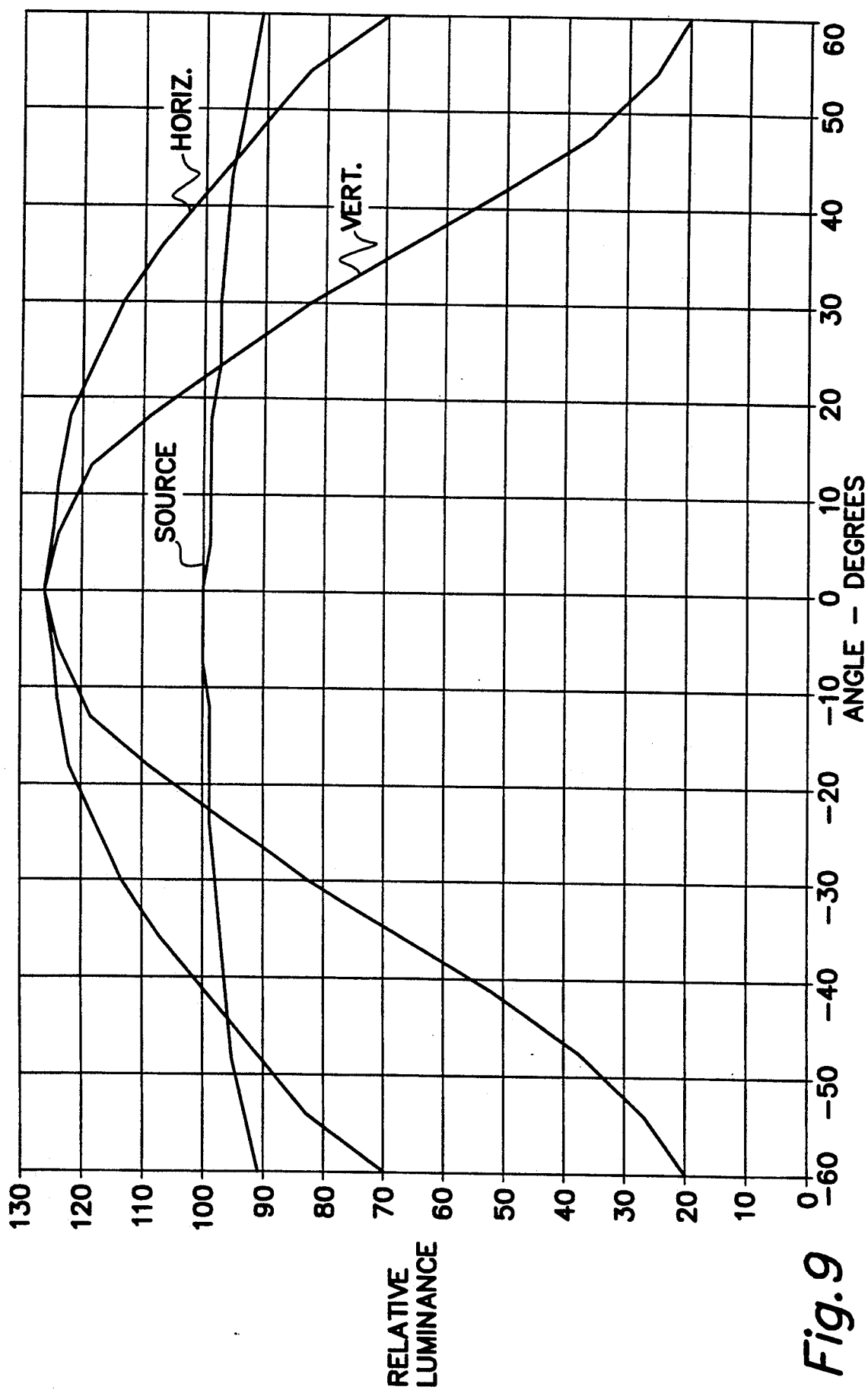
FIG. 9 illustrates the variation of luminance with viewing angle for a triple lens array configuration.

As illustrated in FIG. 7, one of the lens arrays 42 was selected to have a relatively coarse pitch with respect to that of the liquid crystal display and the second lens array 44 was selected to have a relatively fine pitch with respect to that of liquid crystal display. FIG. 8 illustrates again the relatively flat response of the lambertian source diffuser alone curve 110, and the increased roll off with vertical viewing angle of curve 125 as well as the corresponding variation of luminance with horizonal viewing angle as illustrated by curve 135 for the dual lens array of FIG. 8.

In general it was discovered that the addition of additional lens arrays caused a steeper or more rapid variation of the change in luminance with vertical viewing angle, which was desirable, but the corresponding change in luminance with variations in horizonal viewing angle also became steeper, which was not desirable for the particular application in question. For the particular application in question the preferred embodiment included two lens arrays in series which provided the best tradeoff of decrease in luminance with variation of vertical viewing angle, while not adversely affecting the variation in luminance with horizontal viewing angle.

In addition, since moire effects result when both of the lens arrays have the same spatial frequency, the rear array 42 should have a coarse resolution or low spatial frequency while the front lens array 44 should have a fine resolution or high spatial frequency. The lens arrays and the panel spatial frequencies should be selected to avoid integral multiples of the other. Thus the fine lens array should be as high a spatial frequency as is practical and should be a non integral multiple of the panel frequency. According to these guidelines the fine array frequency becomes approximately 2.5 times the display spatial frequency and the coarse array frequency should be approximately the fine array frequency divided by 3.5, 4.5, 5.5 or as required for the most convenient fabrication.

Figure 10:
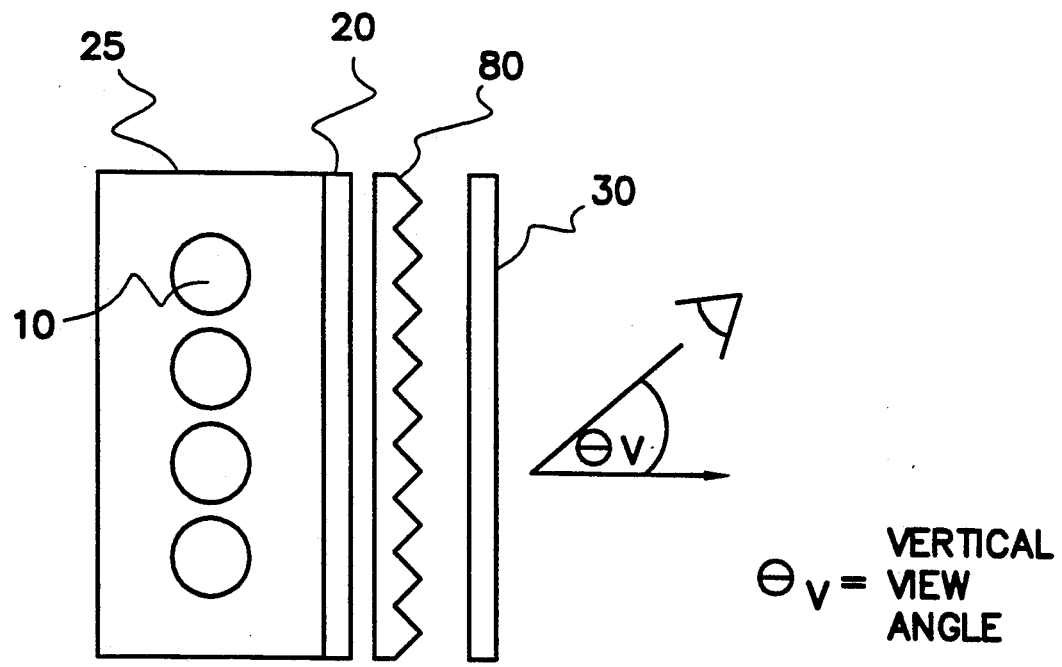
FIG. 10 is a cross sectional view of a configuration utilizing a triangular shaped lens array.
Figure 11:
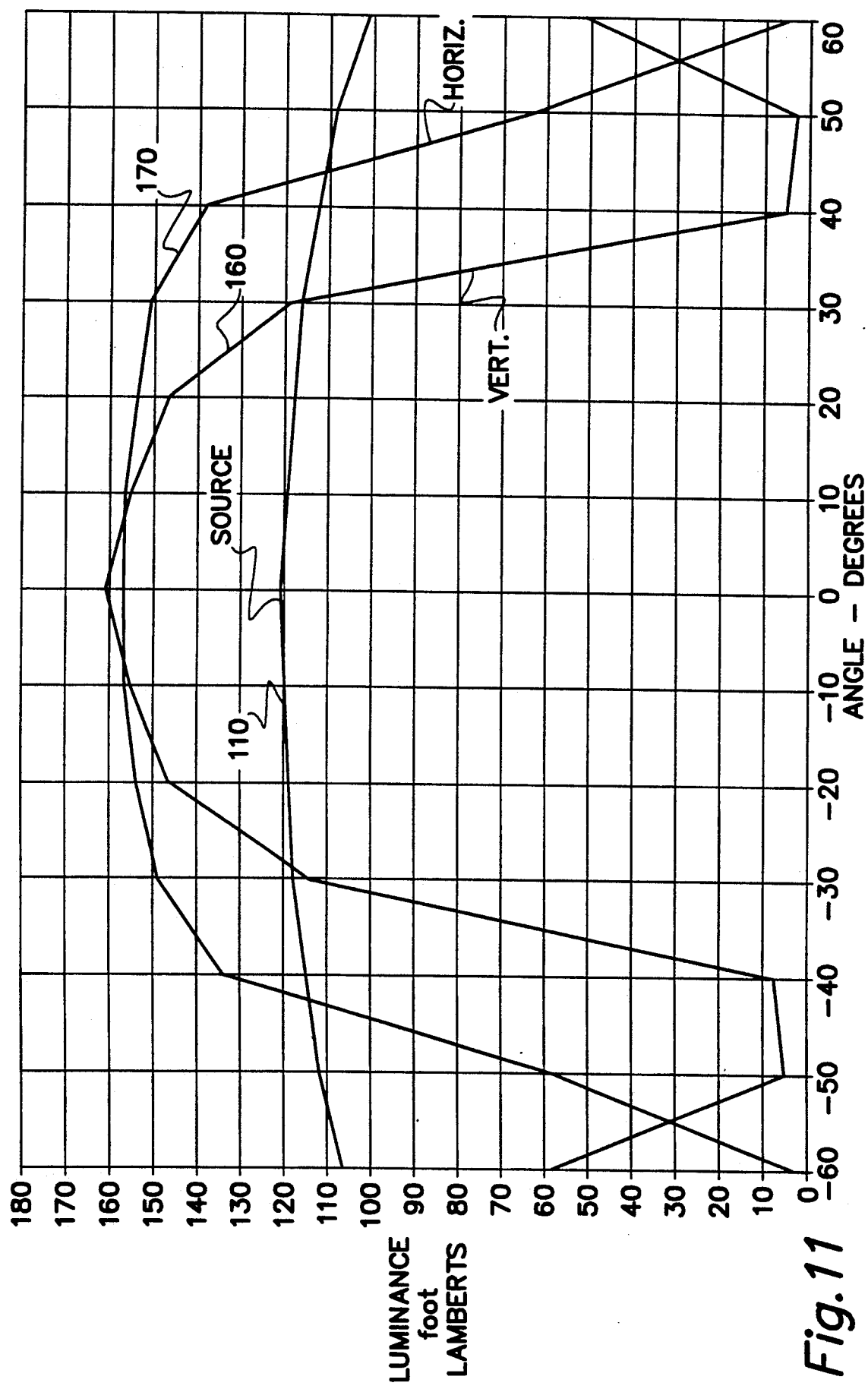
FIG. 11 illustrates the variation of luminance with viewing angle for the triangular shaped lens array.

It was also discovered that the maximum increase in luminance was obtained using a triangular lens array having an included angle of 90° as illustrated in FIG. 10. This configuration resulted in a variation of luminance with vertical and horizonal viewing angles which was quite steep as illustrated by curves 160 and 170 of FIG. 11. Other lens array shapes may be selected as desired to obtain the required concentration of luminance and variation of luminance with vertical and horizonal viewing angle for a particular application.

Figure 12:
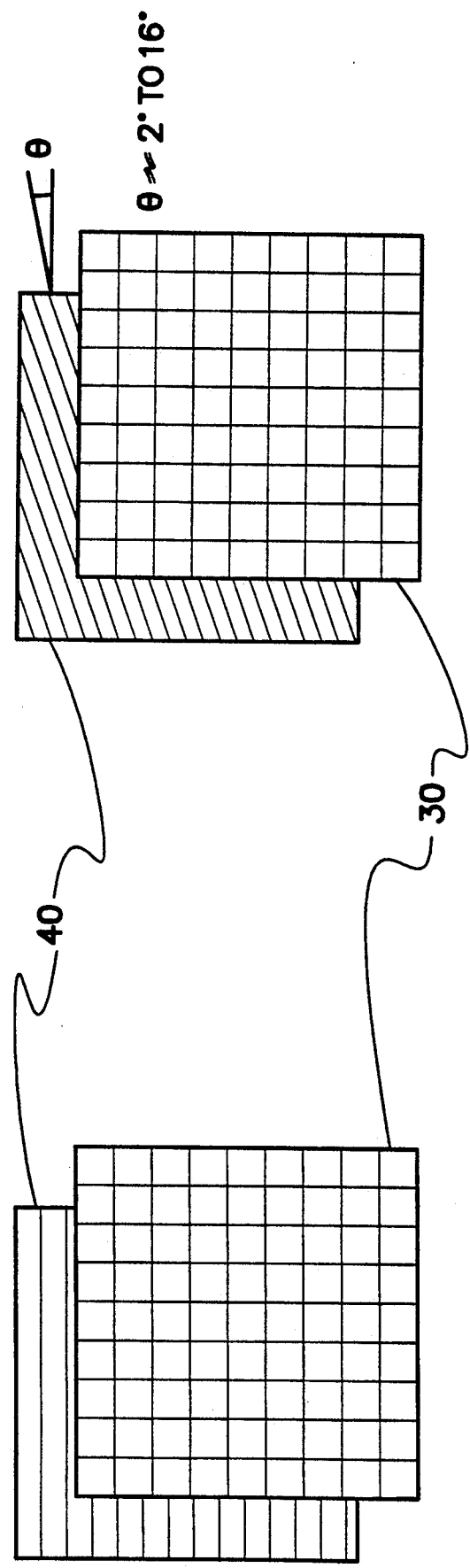
FIG. 12 shows the angular rotation of the lens array with respect to the LCD matrix array to eliminate residual moire effects.

Even though the spatial frequencies of the directional diffuser lens array and LCD panel have been selected to be greatly different and non-integer multiples, some visual banding effects or moire pattern effects may still be apparent to the viewer. This is especially true at off-axis viewing conditions. This residual moire can be removed by rotating the lens array 40 with the respect to the LCD array 30, as illustrated in FIG. 12. This rotation of the lens array by a few degrees (Typically 2 to 16 degrees) from the horizontal axis causes a small change in the effective spatial frequency difference of the two arrays and thereby eliminates the residual moire.

In addition to the angular redistribution of the light from the directional diffuser, the lens array also provides an additional diffusing effect, especially for any step variations in luminance that are parallel to (or nearly parallel to within a few degrees) the axis of the lens array. This allows the reduction of the thickness or optical density of the conventional diffuser while still achieving the same system luminance uniformity and masking of undesired spatial artifacts from the light source, but with higher luminance at the output.

While there have been described above the principals of invention in conjunction with several specific embodiments, it is to be clearly understood that these descriptions are made only by way of example and not as a limitation to the scope of the invention.

We claim:

1. A display apparatus comprising:
   a light source;
   a liquid crystal panel mounted adjacent to said light source for receiving light from said light source; and
   first and second lens arrays, each having a plurality of individual lenslets, disposed between said light source and said liquid crystal panel for providing a predetermined variation with viewing angle of light transmission from said light source through said lens arrays and said liquid crystal panel, wherein said liquid crystal panel comprises a plurality of pixels arranged in rows and columns, and wherein the number of rows of pixels per unit height, or pitch, of the liquid crystal panel is a first value; the number of lenslets per unit height, or pitch, of said first lens array is a second value which is less than said first value; and the number of lenslets per unit height, or pitch, of said second lens array is a third value which is greater than said first value.

2. A display apparatus in accordance with claim 1 wherein said third value is a non-integral multiple of said first value and is also a non-integral multiple of said second value.

3. A display apparatus comprising:
   a light source;
   a liquid crystal panel mounted adjacent to said light source for receiving light from said light source; and
   first and second lens arrays, each having a plurality of individual lenslets, disposed between said light source and said liquid crystal panel for providing a predetermined variation with viewing angle of light transmission from said light source through said lens arrays and said liquid crystal panel, wherein at least one of said first and second lens arrays is rotated about an axis perpendicular to said liquid crystal panel in order to provide a slight misalignment between said lenslets and said liquid crystal panel.

* * * * *